United States Patent
Mitchell et al.

(10) Patent No.: US 10,463,983 B2
(45) Date of Patent: Nov. 5, 2019

(54) DISTILLATION AND ESSENCE EXTRACTOR INSERT FOR BEER BREWING MACHINE

(71) Applicants: James B. Mitchell, Seattle, WA (US); Avi R. Geiger, Seattle, WA (US)

(72) Inventors: James B. Mitchell, Seattle, WA (US); Avi R. Geiger, Seattle, WA (US)

(73) Assignee: PicoBrew, Inc., Seattle, WA (US)

( * ) Notice: Subject to any disclaimer, the term of this patent is extended or adjusted under 35 U.S.C. 154(b) by 34 days.

(21) Appl. No.: 15/476,799

(22) Filed: Mar. 31, 2017

(65) Prior Publication Data
US 2018/0280826 A1 Oct. 4, 2018

(51) Int. Cl.
| | |
|---|---|
| *B01D 3/10* | (2006.01) |
| *B01D 1/00* | (2006.01) |
| *B01D 1/02* | (2006.01) |
| *B01D 5/00* | (2006.01) |
| *B01D 3/00* | (2006.01) |

(52) U.S. Cl.
CPC .............. *B01D 1/0082* (2013.01); *B01D 1/02* (2013.01); *B01D 3/001* (2013.01); *B01D 3/10* (2013.01); *B01D 5/0006* (2013.01); *B01D 5/006* (2013.01)

(58) Field of Classification Search
CPC ........ B01D 1/0082; B01D 1/02; B01D 3/001; B01D 3/10; B01D 5/0006; B01D 5/006
See application file for complete search history.

(56) References Cited

U.S. PATENT DOCUMENTS

| | | | | |
|---|---|---|---|---|
| 941,009 A | | 11/1909 | Cauchois | |
| 2,290,373 A | * | 7/1942 | Porter .................. | B01D 5/0027 196/140 |
| 2,476,280 A | * | 7/1949 | Bragg .................. | B01D 3/4255 196/132 |

(Continued)

FOREIGN PATENT DOCUMENTS

| | | |
|---|---|---|
| DE | 202012103852 U1 | 11/2012 |
| GB | 1444344 A | 7/1976 |

(Continued)

OTHER PUBLICATIONS

Aurora Haley, "Icon Usability" published Jul. 27, 2014, Nielsen Norman Group, 8 pages.

(Continued)

*Primary Examiner* — Jonathan Miller
(74) *Attorney, Agent, or Firm* — Russell Krajec; Krajec Patent Offices, LLC

(57) ABSTRACT

A distillation/extraction insert may attach to a vessel containing liquid to be distilled, and may use heated water circulating through a heating coil, as well as draw a partial vacuum to induce boiling. A condensation coil may collect the vapor and condense the vapor into distillate. A controller may monitor various temperatures and vacuum level to precisely control the heated water being used to boil components in the liquid. The heated water may be created by a beer making machine, which may have a temperature controlled recirculating water system. The insert may be a self-contained unit that attaches to a vessel, where the vessel may also be used for fermenting brewer's mash for distillation. In some cases, an extraction chamber may be used for collecting essential oils from various materials.

21 Claims, 4 Drawing Sheets

(56) References Cited

U.S. PATENT DOCUMENTS

| | | | |
|---|---|---|---|
| 2,547,481 A | 4/1951 | J | |
| 2,761,200 A | 9/1956 | Arnett | |
| 2,830,528 A | 4/1958 | Arnett | |
| 3,057,726 A | 10/1962 | Teignmouth | |
| 3,102,813 A | 9/1963 | Teignmouth et al. | |
| 3,232,211 A | 2/1966 | O'malley | |
| 3,563,157 A | 2/1971 | Lenz | |
| 3,683,790 A | 8/1972 | Jr et al. | |
| 3,759,483 A | 9/1973 | Baxter | |
| 3,984,326 A | 10/1976 | Bendel | |
| 4,054,523 A | 10/1977 | Ingenito et al. | |
| 4,373,024 A | 2/1983 | Hunt | |
| 4,441,406 A | 4/1984 | Becker et al. | |
| 4,503,502 A | 3/1985 | Chapin | |
| 4,552,060 A | 11/1985 | Redl et al. | |
| 4,557,186 A | 12/1985 | Brown | |
| 4,604,363 A * | 8/1986 | Newhouse | B01D 1/0082 159/47.1 |
| 4,751,875 A | 6/1988 | Wooten | |
| 4,754,696 A | 7/1988 | Sarazen et al. | |
| 4,754,698 A | 7/1988 | Naish | |
| 4,790,239 A | 12/1988 | Hewitt | |
| 4,846,935 A * | 7/1989 | Giesselmann | A23F 5/486 203/86 |
| 4,846,969 A | 7/1989 | Ordelheide et al. | |
| 5,132,918 A * | 7/1992 | Funk | B01D 3/4272 201/1 |
| 5,158,793 A | 10/1992 | Helbling | |
| 5,265,518 A | 11/1993 | Reese et al. | |
| 5,311,811 A | 5/1994 | Kuzyk | |
| 5,338,409 A * | 8/1994 | Heierli | B01D 1/0017 159/22 |
| 5,413,566 A | 5/1995 | Sevrain et al. | |
| 5,538,598 A * | 7/1996 | Schlesinger | B01D 1/0017 202/197 |
| 5,770,019 A * | 6/1998 | Kurematsu | B01D 3/007 159/44 |
| 5,865,093 A | 2/1999 | Wasmuht et al. | |
| 5,868,062 A | 2/1999 | Enomoto | |
| 5,906,151 A | 5/1999 | Firestone et al. | |
| 5,922,191 A | 7/1999 | Mata et al. | |
| 5,970,846 A | 10/1999 | Roehr | |
| 5,980,695 A * | 11/1999 | Cox | B01D 3/42 202/166 |
| 6,032,571 A | 3/2000 | Brous et al. | |
| 6,159,345 A * | 12/2000 | Donnelly | B01D 3/007 202/160 |
| 6,276,264 B1 | 8/2001 | Dumm | |
| 6,475,537 B1 | 11/2002 | King et al. | |
| 6,629,490 B1 | 10/2003 | Lu et al. | |
| 6,666,967 B1 | 12/2003 | Oyabu | |
| 7,263,413 B1 * | 8/2007 | Hofmann | G05B 15/02 700/19 |
| 7,390,380 B1 * | 6/2008 | Molintas | B01D 3/06 159/2.1 |
| 7,963,213 B1 | 6/2011 | Murdock | |
| 8,141,477 B2 | 3/2012 | Broderick | |
| 8,473,106 B2 * | 6/2013 | Clark | G05B 15/02 700/276 |
| 8,761,908 B2 * | 6/2014 | Clark | G05B 15/02 700/17 |
| 8,894,822 B2 * | 11/2014 | Pinhack | B01D 3/085 159/25.1 |
| 8,993,273 B1 | 3/2015 | Blichmann | |
| 9,102,908 B1 | 8/2015 | Mitchell et al. | |
| 9,109,192 B1 | 8/2015 | Mitchell et al. | |
| 9,228,163 B1 | 1/2016 | Mitchell et al. | |
| 9,272,230 B2 * | 3/2016 | Myers | B01D 11/0219 |
| 9,376,653 B1 | 6/2016 | Mitchell et al. | |
| 9,395,711 B2 * | 7/2016 | Clark | G05B 15/02 |
| 9,688,949 B2 | 6/2017 | Mitchell et al. | |
| 9,816,400 B1 * | 11/2017 | Phelps, Sr. | F01K 17/04 |
| 9,932,547 B2 | 4/2018 | Mitchell et al. | |
| 9,956,501 B2 * | 5/2018 | Balass | B01D 3/38 |
| 2001/0035097 A1 | 11/2001 | Shaanan et al. | |
| 2002/0029694 A1 | 3/2002 | Wong | |
| 2003/0019031 A1 | 1/2003 | Mosis | |
| 2003/0153059 A1 | 8/2003 | Pilkington et al. | |
| 2005/0011364 A1 | 1/2005 | Chen et al. | |
| 2005/0103213 A1 | 5/2005 | Dumm | |
| 2005/0160917 A1 | 7/2005 | Gantt et al. | |
| 2008/0000357 A1 | 1/2008 | Yang et al. | |
| 2008/0128261 A1 * | 6/2008 | Balass | B01D 5/0012 202/176 |
| 2008/0210384 A1 * | 9/2008 | Guthrie | B01D 1/222 159/6.1 |
| 2008/0282897 A1 | 11/2008 | Webster et al. | |
| 2009/0007796 A1 | 1/2009 | Ricotti | |
| 2009/0159421 A1 * | 6/2009 | Aadland | B01D 1/0041 203/11 |
| 2009/0229471 A1 | 9/2009 | Lun et al. | |
| 2009/0246341 A1 | 10/2009 | Pitner et al. | |
| 2010/0064900 A1 | 3/2010 | Reyhanloo | |
| 2010/0107887 A1 | 5/2010 | Bentley et al. | |
| 2010/0200388 A1 * | 8/2010 | Ward | B01D 1/28 202/180 |
| 2010/0236949 A1 | 9/2010 | Vacca et al. | |
| 2010/0305718 A1 * | 12/2010 | Clark | G05B 15/02 700/17 |
| 2010/0313765 A1 | 12/2010 | Hale | |
| 2011/0192710 A1 * | 8/2011 | Pinhack | B01D 3/085 201/1 |
| 2011/0246091 A1 | 10/2011 | Fedele | |
| 2011/0268846 A1 | 11/2011 | Nair et al. | |
| 2012/0310413 A1 | 12/2012 | Bluck et al. | |
| 2013/0202487 A1 | 8/2013 | Gorelik et al. | |
| 2014/0017354 A1 | 1/2014 | Joseph et al. | |
| 2014/0092706 A1 | 4/2014 | Ishii | |
| 2014/0234482 A1 | 8/2014 | Kempfert | |
| 2014/0287129 A1 | 9/2014 | Hutcheson et al. | |
| 2015/0000530 A1 | 1/2015 | Mitchell et al. | |
| 2015/0000531 A1 | 1/2015 | Mitchell et al. | |
| 2015/0000532 A1 | 1/2015 | Mitchell et al. | |
| 2015/0161871 A1 | 6/2015 | Kim DOC | |
| 2015/0257573 A1 | 9/2015 | Gabara | |
| 2016/0075979 A1 | 3/2016 | Mitchell | |
| 2016/0272927 A1 | 9/2016 | Mitchell | |
| 2016/0272928 A1 | 9/2016 | Mitchell | |
| 2017/0022462 A1 | 1/2017 | Mitchell et al. | |
| 2017/0029752 A1 | 2/2017 | Mitchell et al. | |
| 2017/0051236 A1 | 2/2017 | Mitchell | |
| 2017/0130177 A1 | 5/2017 | Geiger | |
| 2017/0130178 A1 | 5/2017 | Mitchell | |
| 2017/0321810 A1 | 11/2017 | Geiger | |
| 2018/0057778 A1 | 3/2018 | Mitchell | |
| 2018/0171273 A1 | 6/2018 | Mitchell et al. | |

FOREIGN PATENT DOCUMENTS

| | | |
|---|---|---|
| WO | 2015173037 A1 | 11/2015 |
| WO | 2016057981 A1 | 4/2016 |

OTHER PUBLICATIONS

BeerSmith 2 (www.youtube.com/watch?v=68t9_IK-4vY) published Jun. 5, 2011 and accessed Mar. 5, 2018.

BeerTools Pro 1.5 Brewing Software in (www.youtube.com/watch?v=REgYNF_3SZc) published online Mar. 21, 2011 and accessed Mar. 5, 2015.

International Search Report, Intellectual Property Office of Singapore, PCT/IB2017/052677, dated Feb. 8, 2017.

Jeff Flowers, How to Raise the ABV of Your Homebrew, May 1, 2014, https://learn.kegerator.com/raising-abv/ (accessed Mar. 1, 2018), pp. 1-10.

Ken Schwartz, Son of Fermentation Chiller or, "Better Late than Never . . . ", pp. 1-14, 1997.

Vinepair, Tasting Beer—The Role of Alcohol by Volume (ABV) https://vinepair.com/beer-101/tasting-beer-the-role-of-alcohol-by-volume-abv/ (accessed Mar. 1, 2018), pp. 1-5.

(56) References Cited

OTHER PUBLICATIONS

Written Opinion of ISA, Intellectual Property Office of Singapore, PCT/IB2017/052677, dated Feb. 8, 2017.

* cited by examiner

300
ASSEMBLY,
PREPARATION,
AND OPERATION
OF DISTILLATION/
EXTRACTION ATTACHMENT

400
METHOD TO OPERATE DISTILLATION/EXTRACTION SYSTEM

DISTILLATION AND ESSENCE EXTRACTOR INSERT FOR BEER BREWING MACHINE

BACKGROUND

Distillation of fermented mash has been practiced for ages. From the ancient Greeks and Romans, to the moonshiners of Appalachia, creative people have invented many different techniques for distillation. Distillation is a process of separating substances in a liquid mixture by selective evaporation and condensation. For fermented mash distillation, the goal may be to produce a liquid with high alcohol content.

Distillation techniques can also be used to extract essential oils from substances. For example, flavorings and other volatile elements may be extracted from virtually any plant product, such as hops, fruits, herbs, and many others. The extraction techniques may evaporate a solvent that may permeate the material, then produce "essential" oils. Such essential oils are "essential" in the sense that they contain the "essence of" a plant's fragrance or other characteristics.

SUMMARY

A distillation/extraction insert may attach to a vessel containing liquid to be distilled, and may use heated water circulating through a heating coil, as well as draw a partial vacuum to induce boiling. A condensation coil may collect the vapor and condense the vapor into distillate. A controller may monitor various temperatures and vacuum level to precisely control the heated water being used to boil components in the liquid. The heated water may be created by a beer making machine, which may have a temperature controlled recirculating water system. The insert may be a self-contained unit that attaches to a vessel, where the vessel may also be used for fermenting brewer's mash for distillation. In some cases, an extraction chamber may be used for collecting essential oils from various materials.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
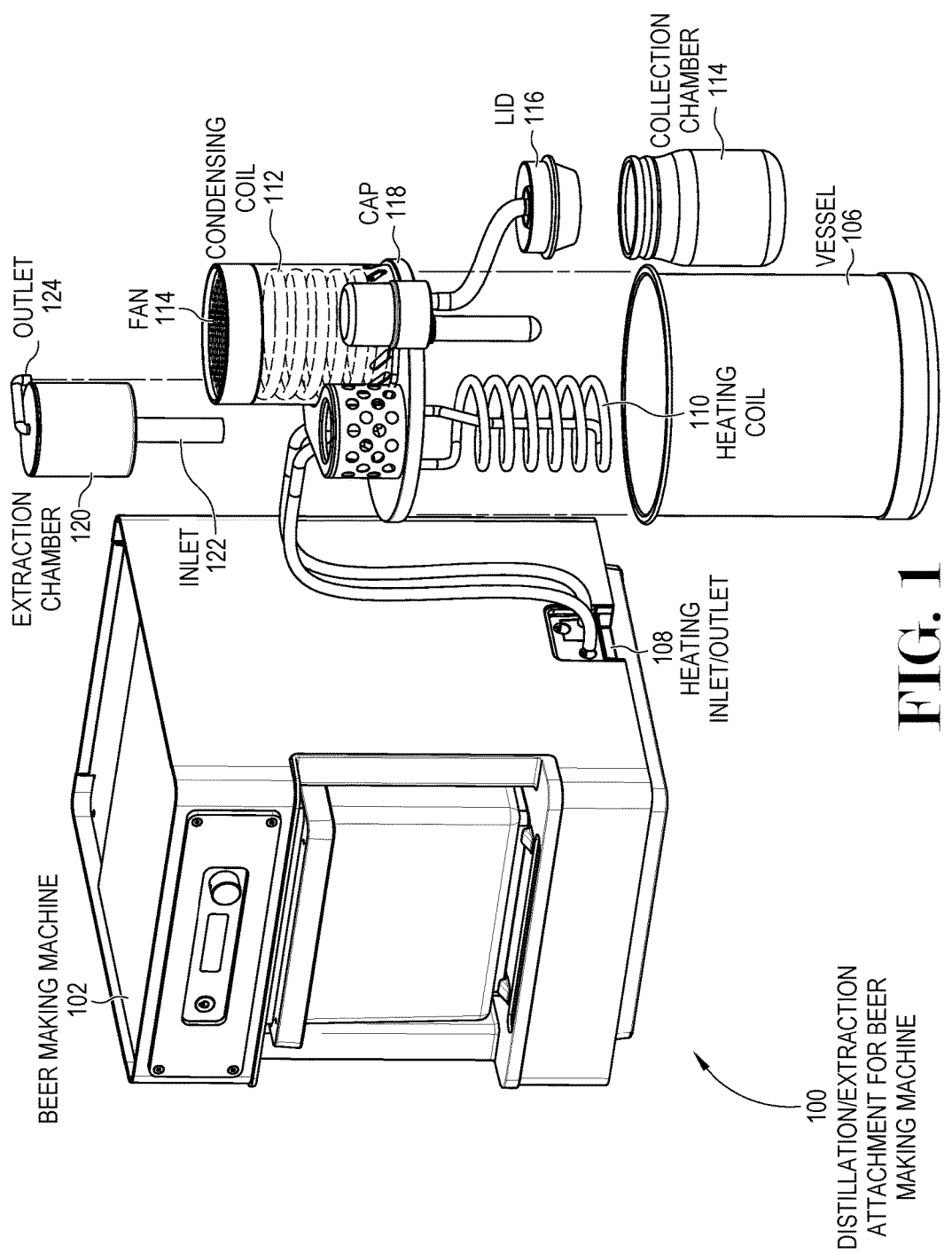
FIG. 1 is a diagram illustration of an embodiment showing a beer making machine with a distillation/extraction accessory.

Distillation and Essence Extractor Insert for Beer Brewing Machine

A distillation and essence extractor insert may be used to heat a liquid mixture and collect distillate. Such an insert may be used in conjunction with a beer making machine, where the beer making machine may supply heated water to heat the liquid mixture. A controller may control the temperature of the liquid, and in conjunction with a vacuum applied to the system, may precisely control the boiling temperature.

As the liquid boils at a specific temperature and pressure, the vapor may be captured and passed through a condenser. The condenser may lower the temperature of the vapor, causing it to return to a liquid state. This distillate may be collected in a collection container.

The use of a partial vacuum in the system may allow for lower temperature boiling during distillation. Such a system may be useful when the water temperature provided to heat the liquid may be below the boiling point of water. The lower internal pressure may cause boiling to occur at a lower temperature than at atmospheric temperature.

A vacuum system may be part of a safety system during distillation. When distilling alcohol, the distillate may be flammable and therefore dangerous. A safety system may have a mechanism to relieve vacuum pressure when a dangerous situation may be detected, thereby causing any boiling to cease immediately.

A safety system may have a valve or other mechanism that may be tripped when a temperature may reach a dangerous level. Such a system may use a mechanical thermostat valve that may vent the vacuum at a predefined temperature, thereby preventing creating flammable vapors at a certain temperature. Other systems may have a valve controlled by a controller device, where the valve may be a normally open valve that may vent when power may be removed. Some systems may use normally closed valves that may vent when power may be applied.

In some systems, a vacuum pump may be selected to vent the vacuum when power may be removed from the pump. Such systems may apply a relatively modest level of vacuum and when the pump ceases to operate, the liquid may quickly return to atmospheric pressure. Such systems may be inherently safe as they may return to a safe state when power may be removed.

A controller may operate the distillation/extraction insert by causing heated water to circulate through a heating coil. The controller may use temperature sensors located at various points of the system, including at a vapor collection point, and in many cases, at a condensate collection point. The temperature at a vapor collection point coupled with the internal pressure may be used to control the water temperature being circulated through a heating coil.

In many cases, a controller may operate on a pre-programmed routine. In some such routines, a mechanical or automatic head collection container may collect the first portions of the distillate. Such a container may collect the "heads" of a distillation, which may contain undesirable distillate. In some cases, the heads may be harmful if consumed.

Such a controller may maintain a target temperature and vacuum for a period of time. During this phase, a collection container may receive the "hearts" of the distillation process. After this period, the device may be turned off, leaving the "tails" in the vessel to be discarded.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory. When the subject matter is embodied in "non-transitory" media, the media may be any storage media that expressly does not include live signals.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram illustration of an embodiment 100 showing a distillation/extraction attachment with a beer brewing system. Embodiment 100 may represent one design where a beer making system may be used to generate temperature controlled, recirculating water that may be used by a distillation attachment to distill beer into spirits, extract essential oils from various substances, or other uses.

A beer making machine 102 may be shown with a distillation/extraction insert 104 that may fit over a vessel 106. The distillation/extraction insert 104 may be an accessory that may be sold together or separately from the beer making machine 102.

The beer making machine 102 may have a recirculating water heating system that may recirculate liquid and heat the liquid in the recirculating path. There are several versions of such machines, some of which may be known as RIMS for recirculating infusion mash system or HERMS, heat exchange recirculating mash systems. Some beer making machines 102 may apply direct heat to the recirculating liquid, as in a RIMS system, while other machines may use a heat exchanger as in a HERMS system. Still other beer making machines may inject steam into the recirculating liquid or may have other heating mechanisms.

The beer making machine 102 may typically have a recirculating pump that may cause liquid to recirculate past the heating mechanism and into a reservoir. Such systems are often considered very good at maintaining specific temperature settings, and when sufficient energy may be added or removed to the recirculating liquid, such systems may increase or decrease temperature in a rapid but controlled manner.

The recirculating liquid may attach to the insert 104 through a set of heating inlet and outlet connections 108, and may recirculate through a heating coil 110. The heating coil 110 may be placed inside the vessel 106 and may heat liquid placed in the vessel 106.

As the liquid in vessel 106 heats up, the components with lower boiling points may begin to vaporize. The vapor may collect in the condensing coil 112, which may be cooled by a fan 114. The vapor may condense into distillate, and may pass through a lid 116 and into a collection chamber 114.

A vacuum system, not shown in this illustration, may lower the pressure inside the vessel 106, condensing coil 112, and collection container 114. By lowering the pressure, the temperature at which boiling may occur may be lowered.

A controller may operate the insert 104 in conjunction with the beer making machine 102 to perform distillation, essential oil extraction, or other operations. In some cases, the insert 104 may have a controller that may operate in conjunction with a controller for the beer making machine 102. In other cases, a beer making machine controller may connect to various sensors and devices on the insert 104 to control the system during distillation or extraction operations.

The insert 104 as illustrated may be a self-contained device that may be an accessory for the beer making machine 102. In such a configuration, all of the various components may be attached to a cap 118, which may be affixed to the vessel 106. In some cases, some components may be rigidly or flexibly attached. For example, the heating coil 110 may be rigidly attached in some cases, especially when the insert 104 may be designed to work with a specific sized vessel 106. A rigidly attached heating coil may be useful in some cases to have a single device that may be easily handled by a user.

In other cases, the heating coil 110 may be flexibly attached and designed to lay at the bottom of the vessel 106. Such designs may be useful when the insert 104 may be used with different sized vessels. A flexible attachment may include lengths of flexible hose that may carry recirculating water from the heating inlet and outlet connections 108, through the cap 118, then with a flexible connection to the heating coil 110.

The condensing coil 112 and fan 114 may be one mechanism by which vapor may be cooled to form a liquid. The fan 114 may be a constant velocity fan that may be turned on or off by a controller or switch, but in some cases, the fan 114 may be a variable speed fan. A variable speed fan may be useful when a controller may sense the temperature at the vapor collection point and at the condensate exit point. When the temperature difference between the points is low, the fan may be activated to increase the cooling. When the difference in temperature is high, the fan speed may be decreased.

Other mechanisms may be used to condense vapor into liquid. For example, an ice bath may be used to condense vapor. Other mechanisms may have chilled or cool liquid that may be placed in a static container or may be recirculated against a condensing tube.

The condensing mechanism may be illustrated as a coil in embodiment 100 as one example. Other embodiments may have different shaped condensing mechanisms.

An extraction chamber 120 may be illustrated as exploded from the accessory. The extraction chamber 120 may be used for extracting essential oils and other essences from various materials that may be placed in the extraction chamber 120. The extraction chamber 120 may have an inlet 122 that may receive vapor from the vessel 106, and an outlet 124 that may connect to the condensing coil 112.

Figure 2:
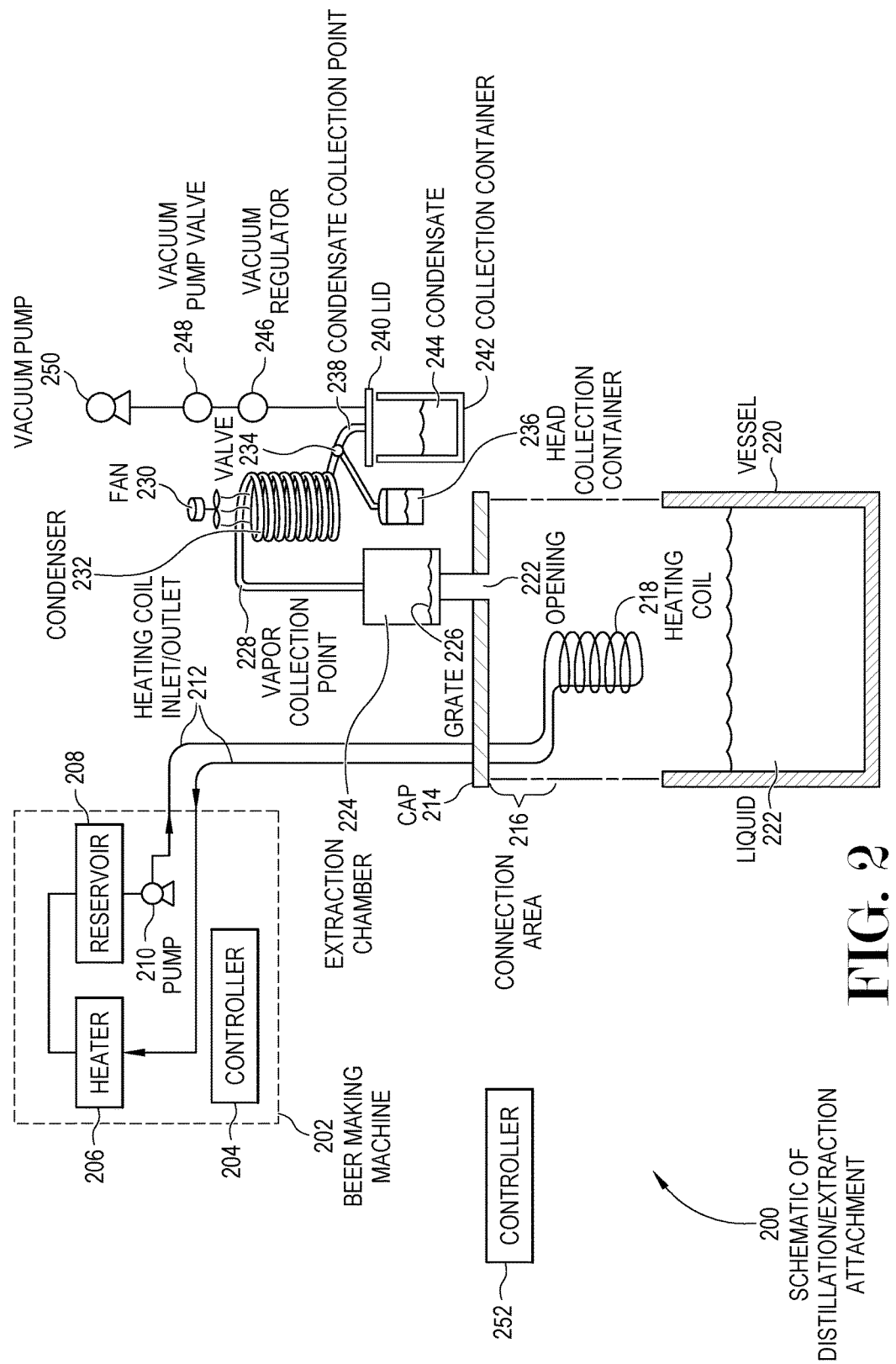
FIG. 2 is a diagram illustration of an embodiment showing a schematic or functional representation of a distillation/extraction system powered by a beer making machine.

FIG. 2 is a diagram illustration of an embodiment 200 showing a schematic of a distillation/extraction attachment that may be operated with a beer making machine or some other source for temperature controlled, heated liquid.

A beer making machine 202 may be a device that provides temperature controlled water or other liquid to the distillation or extraction apparatus. In this description, the liquid being recirculated by the beer making machine 202 and used to heat the distillation process will be referred to as "water", although alternative liquids may be used.

The beer making machine 202 may have a controller 204 that may cause the beer making machine 202 to operate, including recirculating water and controlling the temperature of the water. The incoming water may be passed through a heater 206, then into a reservoir 208. A pump 210 may extract water from the reservoir and out to the distillation apparatus.

FIG. 2 is a partially exploded diagram illustration of an embodiment 200 showing a schematic representation of a distillation/extraction system that may have heat provided by a beer making machine 202. Embodiment 200 is merely one example of a system where an insert may be attached to a beer making machine 202 and inserted in a vessel 220. The insert may contain many of the components to heat a liquid to selectively give off vapor, then collect and condense the vapor to yield distillate.

The insert may use a combination of heat and vacuum to achieve a desired vaporization condition. At such a condition, a desired component may vaporize. The vapor may be passed through an extraction chamber, where the vapor may extract essential oils or other components from a raw material, which may be a plant-based product in many cases.

The insert may be an accessory for a beer making machine 202, which may be attached to the beer making machine 202 and may extend the functionality of the beer making machine. In some cases, a user may create distiller's beer, which may then be distilled into alcoholic spirits. In other cases, a user may extract essential oils or other essences from various raw materials.

A beer making machine 202 may have a controller 204, which may operate the device. A heater 206 may heat a recirculating liquid, which may be stored in a reservoir 208. A pump 210 may send the heated liquid through a set of heating coil inlet/outlets 212.

The beer making machine 202 may be any device that may heat and recirculate a liquid. In many such devices, wort may be recirculated during a mashing sequence of making beer. Some systems may also recirculate wort during a boiling phase, while other systems may use a different heat source for a boiling phase. Wort may be water in which the various sugars and other components may be dissolved. Grains and other ingredients may be kept at a specific temperature so that various enzymes may convert starches in the grains into sugars, then the sugars and other components may be extracted into the water, forming wort. The wort may be fermented, creating alcohol.

The recirculating system of a beer making machine may be used with a distillation/extraction insert to power a distillation or extraction process. The pump 210 and heater 206 of such systems often have precise control over the temperature of the recirculating liquid, which may typically be water in a distillation or extraction process.

The example of the beer making machine 202 may be merely one example of a temperature controlled, recirculating liquid system. Other systems may have different or additional pumps, different configuration of heating systems, a reservoir or not, or other configurations. The beer making machine 202 may provide a heated liquid supply and a return connection, and may provide water or other liquid heated to a desired temperature.

A beer making machine controller 204 may monitor temperatures of the recirculating liquid and may cause the heater 206 to add heat to achieve a desired temperature. Some systems may also have a cooling system, which may cause the recirculating liquid to be actively cooled during recirculation.

The recirculating liquid may pass through a heating coil inlet/outlet 212, through a cap 214 and a connection area 216 to a heating coil 218. When assembled, the heating coil 218 may be fully or partially immersed in liquid 222 in the vessel 220. As water or other recirculating liquid is heated by the beer making machine 202, the liquid 222 in the vessel 220 may also be heated through the heating coil 218.

The cap 214 may seal to the vessel 220. The seal may be a vacuum seal, such that a partial vacuum may be drawn on the liquid 222. The cap 214 may also be a mechanical connection by which the various components of the distillation/extraction insert may be attached. The mechanical design of the cap 214 and various components may change from one embodiment to the next, and the schematic representation of the cap 214 and other components are merely used to represent functional components of a system, not a final mechanical design.

The heating coil 218 may be immersed in the liquid 222. In some cases, the heating coil 218 may be rigidly attached to the cap 214 or other mechanical component. Such systems may be mechanically sized such that the heating coil 218 may be immersed in the liquid 222 based on a specific sized vessel 220. Other systems may have a flexible connection in the connection area 216 such that the heating coil 218 may rest on or near the bottom of the vessel 220, but where the heating coil 218 may not be rigidly connected. In some cases, such a flexible connection may be designed to operate with vessels of different sizes or different depths.

An opening 222 may collect vapor produced in the vessel 220. The vapor may pass upward through an extraction chamber 224 to a vapor collection point 228.

An extraction chamber 224 may be a container in which various materials may be placed for extracting essential oils. The extraction chamber 224 may have a grate 226 or other mechanism to contain plant matter or other material from which extraction may occur.

In a typical extraction sequence, the liquid 222 may contain a solvent that may vaporize and pass through the extraction chamber 224. Typical solvents may include water and alcohol. By passing a solvent through the extraction chamber containing material, volatile compounds, essential oils, fragrances, and other components may be extracted from the material and dissolved in the vaporized solvent. The vapor may then be condensed and collected into essential oils. Such oils may be used in many different applications. One such application may be to extract essences of hops, which may produce hop oils or other concentrated hops essences. Such essences may be used in the beer making process to adjust a beer's flavor, aroma, or bitterness.

In a distillation sequence, the extraction chamber 224 may be empty or may not be present. In a distillation sequence, vapor may be produced in the vessel 220, then condensed to form a distillate.

A vapor collection point 228 may be the point of the distillation system where the heated vapor may begin to be cooled and may begin condensing. In many distillation and extraction systems, a controller may measure temperature at or near the vapor collection point 228 and may control a heat source to reach a desired temperature at the vapor collection point 228. In many systems, a temperature sensor may be placed at the highest point of the system, which may be the vapor collection point 228.

The vapor may progress through a condenser 232. The condenser 232 may have a cooling mechanism, which in this case may be a fan 230. Other systems may have different cooling systems, from ice or water baths, recirculating cooling systems, or other mechanisms.

In some cases, the fan 230 or other cooling mechanism may be controlled, such as by turning the fan 230 on or off, or by adjusting the speed of the fan. Such control options may be available with many other cooling mechanisms.

A controller may adjust the fan 230 or other cooling mechanism to meet a target temperature at a condensate collection point 238. The controller may be configured to cause the temperature at a condensate collection point 238 to be at or below a maximum temperature. The maximum temperature may be set to avoid safety issues, such as when volatile vapors may not have condensed by the time the vapor reached the condensate collection point.

An unsafe condition may exist, for example, when alcohol vapor may not have condensed and when alcohol vapor may be existing the condenser 232. Such a vapor may be highly volatile and may cause a fire or explosion in such a state. By monitoring a temperature at the condensate collection point 238, a controller may cause the system to shut down or take other emergency steps when a dangerous condition may occur.

The condenser 232 is illustrated as a coil, which may be a typical arrangement for some condensers. Other condensers may be a relatively straight tube that may use air cooling, water cooling, or some other cooling mechanism.

At or near the condensate collection point 238, a valve 234 may be present. Such a valve may switch from directing condensate from a heads collection container 236 or a normal collection container 242. The valve 234 may allow for the separation of the distillation heads to be separated off of the main distillate. In some situations, the heads may be harmful or have other detrimental effects to the final distillate.

The valve 234 may be a manual valve, which may be mechanically operated by a user. In some cases, the valve 234 may be an electrically controlled automatic valve that may be operated by an automated controller. In still other cases, the valve 234 may be an automated mechanical valve that may fill a designated volume of heads first, then switch to routing distillate 244 to the container 242.

A vacuum pump 250 may be configured to cause the distillation operation to occur under partial vacuum. In such a system, a vacuum may be placed on the contents of the vessel 220, as well as the entire condensation path and the collection containers 242 and 236. A vacuum regulator 246 may be a mechanical or electrically-controlled regulator that may maintain a desired vacuum pressure within the distillation system. In many cases, a pressure sensor may be placed in the system, which may be connected to a controller.

A vacuum dump valve 248 may be an emergency relief valve that may dump the vacuum on the distillation system in event of an unsafe condition. Since the vaporization may occur under partial vacuum, by returning the system to atmospheric pressure, the vaporization may be immediately halted. In some cases, the vacuum dump valve 248 may be a mechanical thermostat device that may automatically vent the vacuum when a specific temperature may be reached.

A controller 252 may control the distillation or extraction operation. In some cases, a distillation accessory may have its own controller, which may interact with a controller 204 of the beer making machine. In other cases, a distillation accessory may have a controller 252 which may override or take over control of the beer making machine 202. In still other cases, the beer making machine controller 204 may operate the distillation apparatus.

In many cases, a controller may have inputs such as temperature sensors, liquid level sensors, vacuum or pressure sensors, and other types of inputs. A controller may also be able to start and stop pumps, start, stop, and control heating systems, adjust temperature or pressure set points, and perform other operations. Some embodiments may be fully automated, where a user assembles the device and presses a button. Other systems may be partially automated, where a user may perform certain actions during operation of the distillation apparatus.

Figure 3:
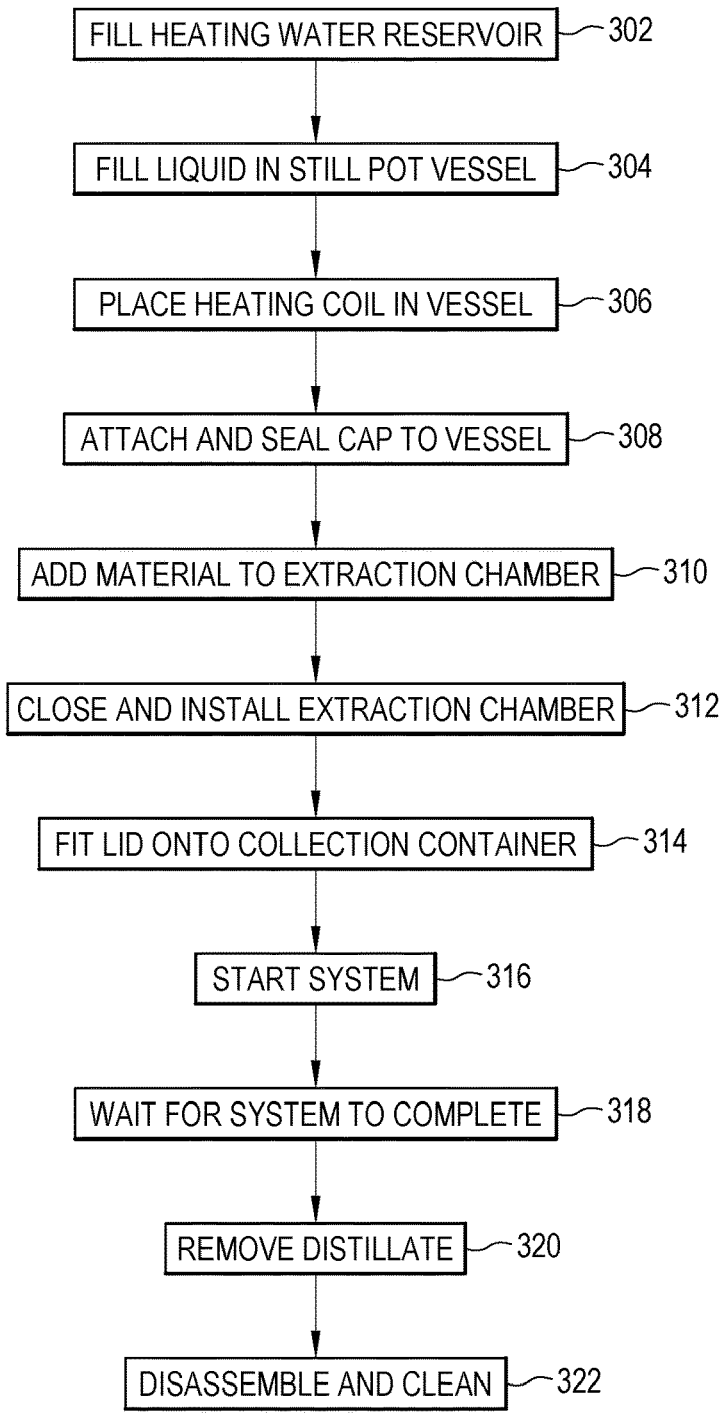
FIG. 3 is a flowchart illustration of an embodiment showing a method for assembling and using a distillation/extraction accessory.

FIG. 3 is a flowchart illustration of an embodiment 300 showing steps a user may perform to use a distillation insert with a beer brewing machine.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The steps illustrated in embodiment 300 may illustrate the general steps a user may take to configure and operate a system such as that shown in embodiment 100 of FIG. 1 or the system of embodiment 200 of FIG. 2. The general steps may vary from one embodiment in sequence or complexity, depending on the specific mechanical design of the systems.

A user may fill heating water in the beer machine reservoir in block 302.

In block 304, a user may fill liquid to be distilled in the still pot vessel. The liquid to be distilled may vary from one recipe or operation to the next. If a user were extracting essential oils from plant matter, such as hops, the user may place highly concentrated alcohol in the vessel if using alcohol as an extraction solvent. If a user was intending to distill spirits, the liquid in the vessel may be distiller's beer.

The heating coil may be placed in the vessel in block 306. In some cases, the heating coil may be rigidly attached to an insert's cap, while in other cases, the heating coil may be flexibly connected. In some cases, the user may place the heating coil in the vessel, then attach the heating coil to the cap or otherwise connect the heating coil.

The cap may be attached and sealed to the vessel in block 308. The seal may be sufficient so that partial vacuum may be pulled on the vessel contents and the distillation system.

If the system may be used for extraction, the material from which essential oils may be extracted may be added to an extraction chamber in block 310 and the extraction chamber may be closed and sealed in block 312. Some systems may not have an extraction chamber.

In some designs, the extraction chamber may be placed inside the vessel. For such designs, a user may load the extraction chamber prior to sealing the cap to the vessel.

A lid may be sealed onto a collection chamber in block 314. In some cases, a heads collection chamber may also be installed. The collection chambers may be fitted with lids so that a vacuum may be applied to the distillation and collection process.

The system may be started in block 316, and the user may wait for the system to complete in block 318. In some cases, a user may manually switch from the heads to hearts collection containers during this time. In other cases, such switchover may be automatically performed.

After processing, the distillate may be removed in block 320 and the system may be disassembled and cleaned in block 322.

Figure 4:
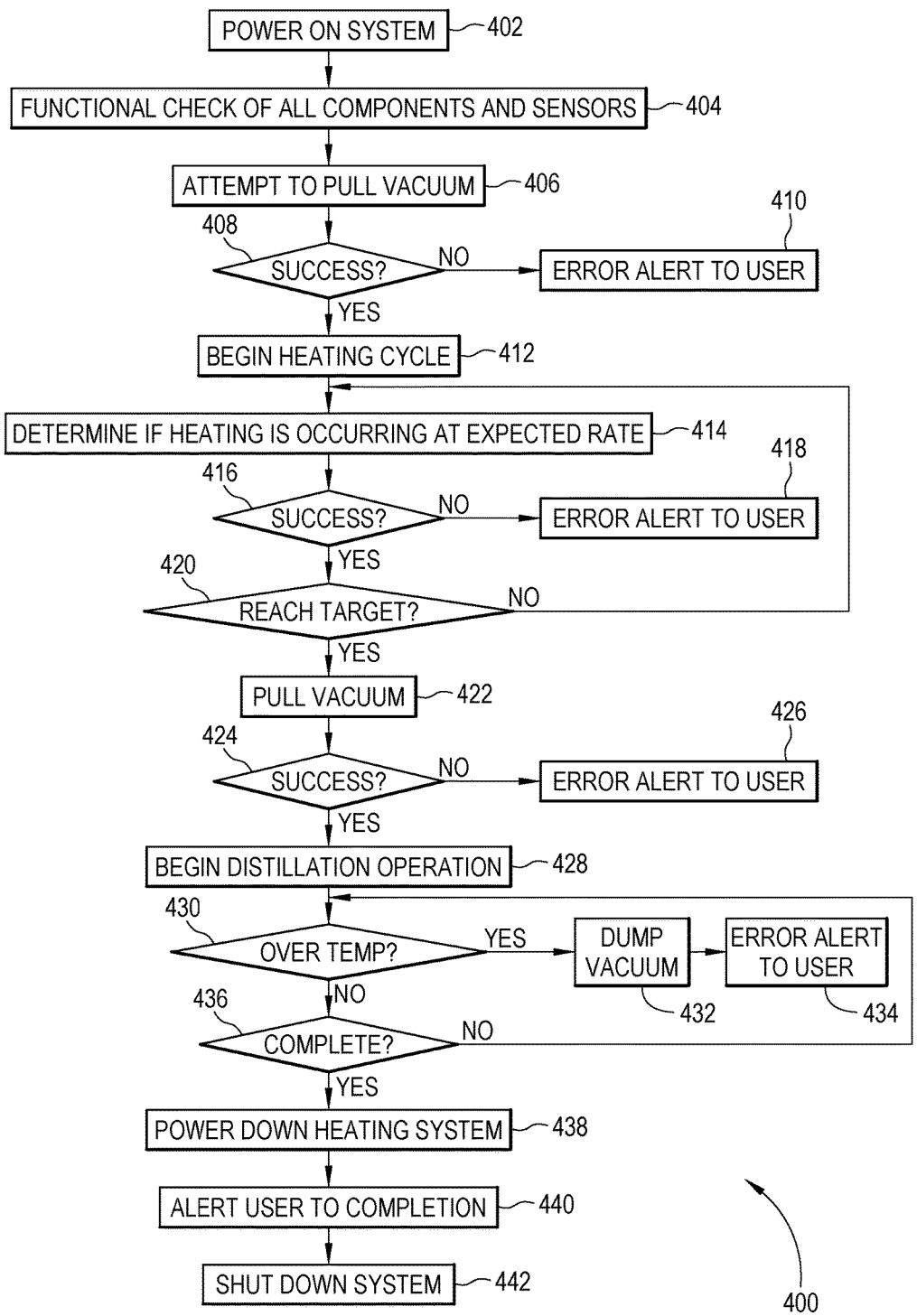
FIG. 4 is a flowchart illustration of an embodiment showing a method for operating a distillation/extraction accessory by an automated controller.

FIG. 4 is a flowchart illustration of an embodiment 300 showing steps a user may perform to use a distillation insert with a beer brewing machine.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

The system may be powered on in block 402, and a functional check may be performed of all components and sensors in block 404. A functional check may attempt to determine if the various temperature sensors and other inputs are reading within expected values, as well as to establish communications with outputs or other controllable elements.

An attempt may be made in block 406 to pull vacuum. If the attempt is successful in block 408, the mechanical system may be assumed to be correctly assembled such that the distillation may proceed in a partial vacuum. If the attempt is not successful in block 408, and alert may be sent to a user in block 410. The system may not proceed until the user corrects the issue and vacuum is successfully achieved.

A heating cycle may begin in block 412. During the heating cycle, a determination may be made in block 414 whether the heating may be occurring at an expected rate. Heating that may occur too quickly may indicate that the user may have forgotten to add liquid in the pot still vessel or that there may be a problem in the heating system. Similarly, heating that may occur too slowly may indicate that too much liquid may be in the pot still vessel or that the heating system may not be functioning correctly.

If a deviation from the expected heating rate occurs in block 416, an error alert may be generated for a user in block 418. The user may be asked to investigate the likely causes of the condition.

If the heating progresses as expected in block 416, but the temperature target is not met in block 420, the process may loop until the target may be reached in block 420. At this state, the temperature target may be maintained.

A vacuum may be initiated in block 422. If the vacuum is not successfully reached in block 424, an error alert may be generated for the user in block 426. Such an error condition may indicate that a leak may have occurred with the system.

When the temperature target has been met and the vacuum applied, the distillation operation may begin in block 428. If an over temperature condition may be detected in block 430, the vacuum may be dumped in block 432 and an error may be generated for a user. If no such condition exists in block 430 but the operation is not complete in block 436, the process may loop back to block 430.

During a distillation operation, there may be separate containers for collecting the heads and hearts of the distillation. In some embodiments, a controller may indicate when a user may be asked to switch a mechanical valve. In other embodiments, a controller may actuate a solenoid or other controllable valve to automatically switch between collection containers.

Once the cycle is complete in block 436, the heating system may be powered down in block 438 and the user may be alerted that the cycle has finished in block 440. The system may then power down in block 442.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A device comprising:
   a cap configured to seal to a liquid vessel;
   a heating coil having a liquid inlet and a liquid outlet, said heating coil configured to heat liquid in said liquid vessel;
   a condenser having a vapor collection point and a condensate exit point, said vapor collection point connected to said cap and configured to capture vapor emitted from said liquid vessel, said condensate exit point having a connection to a collection container;
   a vacuum connection connected to said collection container;

a vacuum sensor connected to said liquid vessel;
a first temperature sensor proximal to said vapor collection point; and
a controller configured to:
sense said vacuum sensor to determine that at least a partial vacuum has been achieved inside said liquid vessel and when said at least said partial vacuum has been achieved, cause water to enter said heating coil;
measure a first temperature at said vapor collection point using said first temperature sensor; and
control water entering said heating coil to match said first temperature to a target temperature.

2. The device of claim 1, said controller further configured to:
determine that an error condition exists; and
cause said vacuum connection to be vented.

3. The device of claim 2, said error condition being an over temperature condition.

4. The device of claim 3 further comprising:
a second temperature sensor proximal to said collection container; and
said over temperature condition being an over temperature condition measured by said second temperature sensor.

5. The device of claim 2 further comprising a vacuum pump connected to said vacuum connection.

6. The device of claim 5, said vacuum pump being controllable by said controller.

7. The device of claim 6, said controller further configured to:
control said vacuum pump to reach a predefined vacuum.

8. The device of claim 7 further comprising a vacuum relief valve.

9. The device of claim 1, said heating coil being attached to said cap.

10. The device of claim 9, said heating coil being flexibly attached to said cap and said liquid inlet and liquid outlet being passed through said cap.

11. The device of claim 1, said cap being configured to cover an opening in said liquid vessel.

12. The device of claim 11, said heating coil being configured to fit through said opening in said liquid vessel.

13. The device of claim 1 further comprising:
a cooling mechanism for said condenser.

14. The device of claim 13, said cooling mechanism comprising a fan.

15. The device of claim 14, said fan being connected to and controlled by said controller.

16. The device of claim 13, said cooling mechanism comprising liquid cooling.

17. The device of claim 13, said cooling mechanism comprising an ice container.

18. The device of claim 1 further comprising:
an extraction chamber connected between said liquid container and said condenser.

19. A system comprising:
a beer making machine being configurable for mashing using a recirculating infusion configuration, said recirculating infusion configuration having a pump to recirculate wort through a heating mechanism and a first temperature sensor to measure temperature of said wort;
said beer making machine having a first liquid inlet and a first liquid outlet, said first liquid inlet and said first liquid outlet configured to flow through said heating mechanism;
said beer making machine having a controller configurable to operate said beer making machine for wort manufacture, as well as to cause said pump to recirculate said wort and control said temperature of said wort using said first temperature sensor;
a distillation attachment comprising:
a cap configured to seal to a liquid vessel;
a heating coil having a second liquid inlet and a second liquid outlet, said heating coil configured to heat liquid in said liquid vessel, said second liquid inlet connectable to said first liquid outlet, and said second liquid outlet connectable to said first liquid inlet;
a condenser having a vapor collection point and a condensate exit point, said vapor collection point connected to said cap and configured to capture vapor emitted from said liquid vessel, said condensate exit point having a connection to a collection container;
a first temperature sensor proximal to said vapor collection point; and
said controller configured to:
measure a first temperature at said vapor collection point using said first temperature sensor; and
control water entering said heating coil to match said first temperature to a target temperature.

20. The system of claim 19, said recirculating infusion configuration being a recirculating infusion mash system (RIMS).

21. The system of claim 19, said recirculating infusion configuration being a heat exchanger recirculating infusion mash system (HERMS).

* * * * *